(12) United States Patent
Shrestha et al.

(10) Patent No.: US 11,894,914 B2
(45) Date of Patent: Feb. 6, 2024

(54) CELL TYPE SELECTION FOR NON-TERRESTRIAL NETWORKS

(71) Applicant: QUALCOMM Incorporated, San Diego, CA (US)

(72) Inventors: Bharat Shrestha, San Diego, CA (US); Alberto Rico Alvarino, San Diego, CA (US); Xiao Feng Wang, San Diego, CA (US); Masato Kitazoe, Tokyo (JP); Ayan Sengupta, San Diego, CA (US); Amer Catovic, San Diego, CA (US); Umesh Phuyal, San Diego, CA (US); Liangping Ma, San Diego, CA (US); Le Liu, Fremont, CA (US)

(73) Assignee: QUALCOMM Incorporated, San Diego, CA (US)

(*) Notice: Subject to any disclaimer, the term of this patent is extended or adjusted under 35 U.S.C. 154(b) by 182 days.

(21) Appl. No.: 17/475,140

(22) Filed: Sep. 14, 2021

(65) Prior Publication Data

US 2022/0085874 A1    Mar. 17, 2022

Related U.S. Application Data

(60) Provisional application No. 63/078,872, filed on Sep. 15, 2020.

(51) Int. Cl.
*H04B 7/185* (2006.01)
*H04W 36/00* (2009.01)
*H04W 36/08* (2009.01)

(52) U.S. Cl.
CPC .... *H04B 7/18541* (2013.01); *H04W 36/0009* (2018.08); *H04W 36/00835* (2018.08); *H04W 36/08* (2013.01)

(58) Field of Classification Search
CPC .......... H04B 7/18541; H04W 36/0009; H04W 36/00835; H04W 36/08; H04W 84/06; H04W 48/20
See application file for complete search history.

(56) References Cited

U.S. PATENT DOCUMENTS

2021/0314835 A1* 10/2021 Lee .................. H04W 36/08
2021/0377825 A1    12/2021 Deenoo et al.
(Continued)

FOREIGN PATENT DOCUMENTS

WO    2020075044 A1    4/2020
WO    2020092561 A1    5/2020

OTHER PUBLICATIONS

International Search Report and Written Opinion—PCT/US2021/050540—ISA/EPO—dated Jan. 31, 2022.
(Continued)

*Primary Examiner* — Ricky Q Ngo
*Assistant Examiner* — Kabir U Jahangir
(74) *Attorney, Agent, or Firm* — Seyfarth Shaw LLP

(57) ABSTRACT

A user equipment (UE) selects or reselects a target cell of a non-terrestrial network or resumes connectivity with the target cell after a satellite handover for a permanently fixed low Earth orbit (LEO) cell. The target cell is a serving or non-serving cell. The UE determines a cell type of the target cell. The cell type may be a LEO cell type, a geostationary Earth orbit (GEO) cell type, a moving cell type, a fixed cell type, a temporarily fixed LEO cell type, or a permanently fixed LEO cell type. The UE completes selection or reselection of the target cell or completes the connectivity with the target cell, based on the cell type.

30 Claims, 7 Drawing Sheets

(56) References Cited

U.S. PATENT DOCUMENTS

| | | | |
|---|---|---|---|
| 2021/0377832 A1* | 12/2021 | Wang | H04W 36/0061 |
| 2021/0399797 A1 | 12/2021 | Khan et al. | |
| 2022/0159481 A1* | 5/2022 | Gao | H04W 24/02 |
| 2022/0377625 A1* | 11/2022 | Li | H04W 36/0058 |
| 2023/0035046 A1* | 2/2023 | You | H04W 76/19 |

OTHER PUBLICATIONS

Partial International Search Report—PCT/US2021/050540—ISA/EPO—dated Dec. 10, 2021.
Qualcomm Incorporated: "Cell Selection and Reselection Enhancements", 3GPP Draft, R2-2009454, 3GPP TSG-RAN WG2 Meeting #112e, 3rd Generation Partnership Project (3GPP), E-Meeting, Nov. 2-13, 2020 (Oct. 23, 2020), 3 Pages, Retrieved from the Internet: URL:https://ftp.3gpp.org/tsg_ran/WG2_RL2/TSGR2_112-e/Docs/R2-2009454.zip, R2-2009454.doc [retrieved on Oct. 23, 2020].
Thales: "Solutions for NR to Support Non-Terrestrial Networks (NTN)", 3GPP Draft, RP-201256, 3GPP TSG RAN meeting #88e, 3rd Generation Partnership Project (3GPP), e-meeting, Jun. 29-Jul. 3, 2020, 10 Pages, Retrieved from the Internet: URL:https://ftp.3gpp.org/tsg_ran/TSG_RAN/TSGR_88e/Docs/RP-201256.zip RP-201256_WIDNR-TN_for Rel-17 v4.3.doc [retrieved on Jun. 30, 2020].
Xiaomi: "Enhancements on Cell Reselection", 3GPP Draft, R2-2009621, 3GPP TSG RAN WG2 #112, 3rd Generation Partnership Project (3GPP), e-Meeting, Nov. 2-13, 2020, 4 Pages, Retrieved from the Internet: URL:https://ftp.3gpp.org/tsg_ran/WG2_RL2/TSGR2_112-e/Docs/R2-2009621.zip R2-2009621_Enhancements on cell reselection. doc [retrieved on Oct. 23, 2020].
ZTE Corporation, et al., "Consideration on System Information and Cell (re)Selection in NTN", 3GPP Draft, R2-2006872, 3GPP TSG RAN WG2 Meeting#111, 3rd Generation Partnership Project (3GPP), Electronic, Aug. 17-28, 2020, 6 Pages, Retrieved from the Internet: URL:https://ftp.3gpp.org/tsg_ran/WG2_RL2/TSGR2_111-e/Docs/R2-2006872.zip R2-2006872_Consideration on system information and cell (re) selection in NTN-v0.docx [retrieved on Aug. 7, 2020].
ZTE Corporation, et al., "Offline-106: [NTN] Idle Mode Issues—2nd Round", 3GPP Draft, R2-2008213, 3GPP TSG RAN WG2 Meeting#111, 3rd Generation Partnership Project (3GPP), Electronic, Aug. 17-28, 2020, 8 Pages, Retrieved from the Internet: URL:https://ftp.3gpp.org/tsg_ran/WG2_RL2/TSGR2_111-e/Docs/R2-2008213.zip, R2-2008213_summary of offlline-106_[NTN] Idle mode issues (ZTE) 2nd round.doc [retrieved on Sep. 1, 2020].
Interdigital Inc. (Email Discussion Rapporteur): "Report of Email Discussion [106#73][NR/NTN] Mobility Issues and Solutions", 3GPP Draft, 3GPP RAN WG2 Meeting #107, R2-1910961 3rd Generation Partnership Project (3GPP), Prague, Czech Republic, Aug. 26-30, 2019, 50 Pages, Retrieved from the Internet: URL: http://www.3gpp.org/ftp/tsg_ran/WG2_RL2/TSGR2_107/Docs/R2-1910961.zip.
International Search Report and Written Opinion—PCT/US2021/050540—ISA/EPO—Apr. 26, 2022.

* cited by examiner

CELL TYPE SELECTION FOR NON-TERRESTRIAL NETWORKS

CROSS-REFERENCE TO RELATED APPLICATION

The present application claims the benefit of U.S. Provisional Patent Application No. 63/078,872, filed on Sep. 15, 2020, and titled "CELL TYPE SELECTION FOR NON-TERRESTRIAL NETWORKS," the disclosure of which is expressly incorporated by reference in its entirety.

FIELD OF THE DISCLOSURE

Aspects of the present disclosure generally relate to wireless communications, and more particularly to techniques and apparatuses for selection between a first cell type, such as a low Earth orbit (LEO) cell type, and a second cell type, such as a geosynchronous Earth orbit (GEO) cell type, in non-terrestrial networks (NTNs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

According to aspects of the present disclosure, a method of wireless communication selects or reselects a target cell of a non-terrestrial network or resumes connectivity with the target cell. The target cell is a serving or non-serving cell. The UE determines a cell type of the target cell. The cell type can be a low Earth orbit (LEO) cell type, a geostationary Earth orbit (GEO) cell type, a moving cell type, a fixed cell type, a temporarily fixed LEO cell type, or a permanently fixed LEO cell type. The UE also completes selection or reselection of the target cell or completes the connectivity with the target cell, based on the cell type.

In other aspects of the present disclosure, an apparatus for wireless communications at a user equipment (UE) includes a processor and memory coupled with the processor. Instructions stored in the memory are operable, when executed by the processor, to cause the apparatus to selector or reselect a target cell of a non-terrestrial network or resume connectivity with the target cell. The target cell is a serving or non-serving cell. The apparatus can determine a cell type of the target cell. The cell type may be a low Earth orbit (LEO) cell type, a geostationary Earth orbit (GEO) cell type, a moving cell type, a fixed cell type, a temporarily fixed LEO cell type, or a permanently fixed LEO cell type. The apparatus can also complete selection or reselection of the target cell or complete the connectivity with the target cell based on the cell type.

In other aspects of the present disclosure, a user equipment (UE) for wireless communications includes means for selecting or reselecting a target cell of a non-terrestrial network or resuming connectivity with the target cell, which may be a serving or non-serving cell. The UE includes means for determining a cell type of the target cell. The cell type may be a low Earth orbit (LEO) cell type, a geostationary Earth orbit (GEO) cell type, a moving cell type, a fixed cell type, a temporarily fixed LEO cell type, or a permanently fixed LEO cell type. The UE also includes means for completing selection or reselection of the target cell or completing the connectivity with the target cell, based on the cell type.

In other aspects of the present disclosure, a non-transitory computer-readable medium with program code recorded thereon is disclosed. The program code is executed by a user equipment (UE) and includes program code to selector reselect a target cell of a non-terrestrial network or resume connectivity with the target cell, which may be a serving or non-serving cell. The UE includes program code to determine a cell type of the target cell. The cell type includes a low Earth orbit (LEO) cell type, a geostationary Earth orbit (GEO) cell type, a moving cell type, a fixed cell type, a temporarily fixed LEO cell type, or a permanently fixed LEO cell type. The UE also includes program code to complete selection or reselection of the target cell or complete the connectivity with the target cell, based on the cell type.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

A wireless communications system may include a non-terrestrial network with a base station utilizing a satellite to relay communications to user equipments (UEs). In other scenarios, the satellite may operate as a base station. The satellite may be a low Earth orbit (LEO) satellite, a geostationary Earth orbit (GEO) satellite, a high altitude platform station (HAPS), or a medium Earth orbit (MEO) satellite, for example. Other cell types include moving cells or fixed cells, as well as terrestrial network cells. A UE may have a preference or limit as to which cell type to select. The techniques described relate to UE cell selection for a specific cell type in a non-terrestrial network.

Aspects of the disclosure are initially described in the context of a wireless communications system. Aspects of the disclosure are also illustrated by and described with reference to a process flow. Aspects of the disclosure are further illustrated by and described with reference to apparatus diagrams, system diagrams, and flowcharts that relate to cell type selection for non-terrestrial networks.

Figure 1:
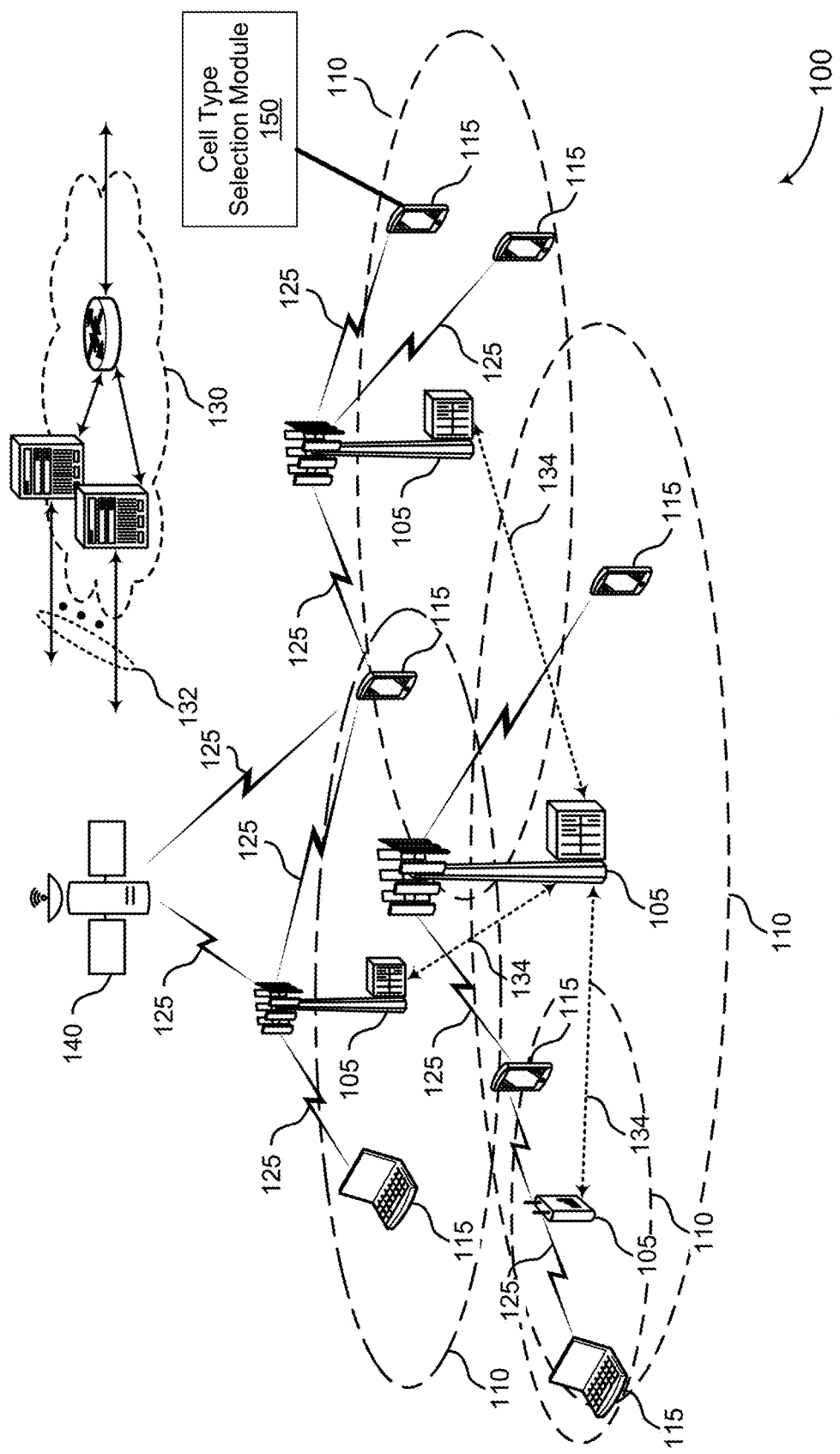
FIG. 1 is a block diagram conceptually illustrating an example of a wireless communications network, in accordance with various aspects of the present disclosure.

FIG. 1 illustrates an example of a non-terrestrial wireless communications system 100 that supports cell type selection in accordance with aspects of the present disclosure. The wireless communications system 100 includes base stations 105, UEs 115, a satellite 140, and a core network 130. In some examples, the wireless communications system 100 may be a long term evolution (LTE) network, an LTE-Advanced (LTE-A) network, an LTE-A Pro network, or a new radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include upstream transmissions from a UE 115 to a base station 105, or downstream transmissions from a base station 105 to a UE 115. Downstream transmissions may also be called downlink or forward link transmissions while upstream transmissions may also be called uplink or reverse link transmissions.

The geographic coverage area 110 for a base station 105 may be divided into sectors each making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier) or a satellite beam, and may be associated with an identifier for distinguishing neighboring cells (e.g., a physical cell identifier (PCID) or a virtual cell identifier (VCID)) operating via the same or a different carrier. A cell may be a moving cell, a temporarily fixed cell, or a permanently fixed cell, for example, with respect to a satellite beam. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmWave) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ license assisted access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downstream transmissions, upstream transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmWave receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at multiple antenna elements of an antenna array, or by processing received signals according to different receive beamforming weight sets applied to signals received at multiple antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the wireless communications system 100 may be a packet-based network that operate according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix (CP) prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downstream or upstream (e.g., in an FDD mode), or be configured to carry downstream and upstream communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downstream carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature that may be referred to as carrier aggregation (CA) or multi-carrier operation. A UE 115 may be configured with multiple downstream CCs and one or more upstream CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, the wireless communications system 100 may be or be related to a terrestrial network. Some examples of terrestrial networks may include NR systems, for example, including base stations 105 and UE s 115. Within an NR system, upstream transmissions (e.g., CP-OFDM or DFT-S-OFDM waveforms) may arrive at a base station 105 from a UE 115 within an interval time, for example, within a CP duration. For subcarrier spacing of 120 kHz, the CP duration may be approximately 0.59 μs. Additionally, subcarrier spacing for mmWave communications within Ka band, such as downstream transmissions between approximately 20 GHz and 30 GHz, may be greater compared to upstream transmissions. For example, the subcarrier spacing greater than 120 kHz may improve communication reliability due to frequency error as a result of Doppler. In this example, a subcarrier spacing greater than 120 kHz may result in a CP duration of 0.25 μs.

In some examples, the wireless communications system 100 may additionally, or alternatively, be or be related to a non-terrestrial network. For example, base stations 105 may utilize the satellite 140 to relay communications to UEs 115. Due to the mobility of the satellite 140 and distance from the satellite 140 to the UEs 115, the communications may experience upstream timing errors (e.g., downstream timing tracking error and/or variation in propagation delay). For example, the satellite 140 may be a non-geostationary satellite that may orbit UEs 115 from 600 km and travel at a speed of approximately 7.6 km/s. As a result, the round-trip time (e.g., an update rate) between the satellite 140 and the UEs 115 may change as much as 50 μs per second.

For example, assuming an upstream timing is ideal at time t (e.g., without any timing adjustment applied to the time t), approximately 10 ms later, the upstream timing error may be approximately 0.5 μs. As a result, the round-trip time for the satellite 140 may be approximately 30 ms, and a timing advance command calculated based on upstream transmission at time t may be off by 1.5 μs when it arrives at a UE 115. To compensate for the upstream timing error, the base station 105 (also referred to as "a gateway") may provide a timing command to the UEs 115 for upstream transmissions. The UEs 115 may receive the timing command and transmit an upstream transmission to the base station 105 using a timing adjustment indicated in the timing command.

The UEs 115 may include a cell type selection module 150. For brevity, only one UE 115 is shown as including the cell type selection module 150. The cell type selection module 150 may select or reselect a target cell of a non-terrestrial network or resume connectivity with the target cell. The target cell is a serving or non-serving cell. The selection module 150 may also determine a cell type of the target cell. The selection module may also complete selection or reselection of the target cell based on the cell type.

Figure 2:
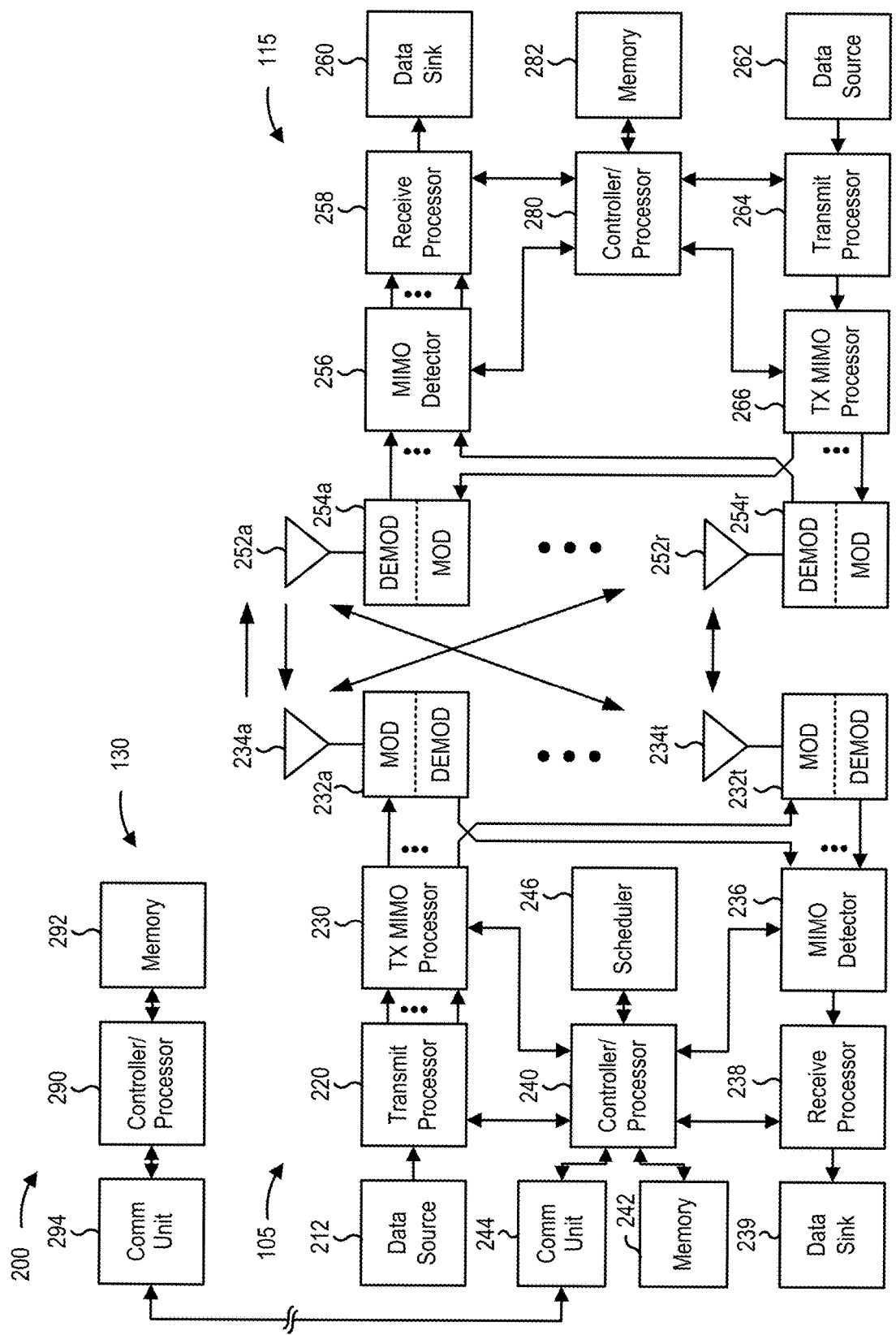
FIG. 2 is a block diagram conceptually illustrating an example of a base station in communication with a user equipment (UE) in a wireless communications network, in accordance with various aspects of the present disclosure.

FIG. 2 shows a block diagram of a design 200 of base station 105 and UE 115, which may be one of the base stations and one of the UEs in FIG. 1. Base station 105 may be equipped with T antennas 234a through 234t, and UE 115 may be equipped with R antennas 252a through 252r, where in general T≥1 and R≥1.

At base station 105, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like), and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 115, antennas 252a through 252r may receive the downlink signals from base station 105 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 115 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 115 may be included in a housing.

On the uplink, at UE 115, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 105. At base station 105, the uplink signals from UE 115 and other UEs may be received by antennas 234, processed by demodulators 254, detected by a MIMO detector 236 if applicable, and further processed by a receive processor 238 to obtain decoded data and control information sent by UE 115. Receive processor 238 may provide the decoded data to a data sink 239 and the decoded control information to controller/processor 240. Base station 105 may include communication unit 244 and communicate to the core network 130 via communication unit 244. The core network 130 may include communication unit 294, controller/processor 290, and memory 292.

The controller/processor 280 of UE 115, and/or any other component(s) of FIG. 2 may perform one or more techniques associated with cell type selection, as described in more detail elsewhere. The UE may be a smart UE capable of eMBB data and voice or an NR UE, for example. The controller/processor 280 of the UE 115, and/or any other component(s) of FIG. 2 may perform or direct operations of, for example, the method of FIGS. 6 and/or 7 and/or other processes as described. Memories 242 and 282 may store data and program codes for base station 105 and UE 115, respectively. A scheduler 246 may schedule UEs for data transmission on the downlink and/or uplink.

In some aspects, the UE 115 may include means for selecting, reselecting, or resuming, means for determining, means for completing, means for obtaining, means for receiving, means for mapping, means for barring, means for tracking, means for communicating, and/or means for reporting. Such means may include one or more components of the UE 115 described in connection with FIG. 2.

As indicated above, FIG. 2 is provided merely as an example. Other examples may differ from what is described with regard to FIG. 2.

Figure 3:
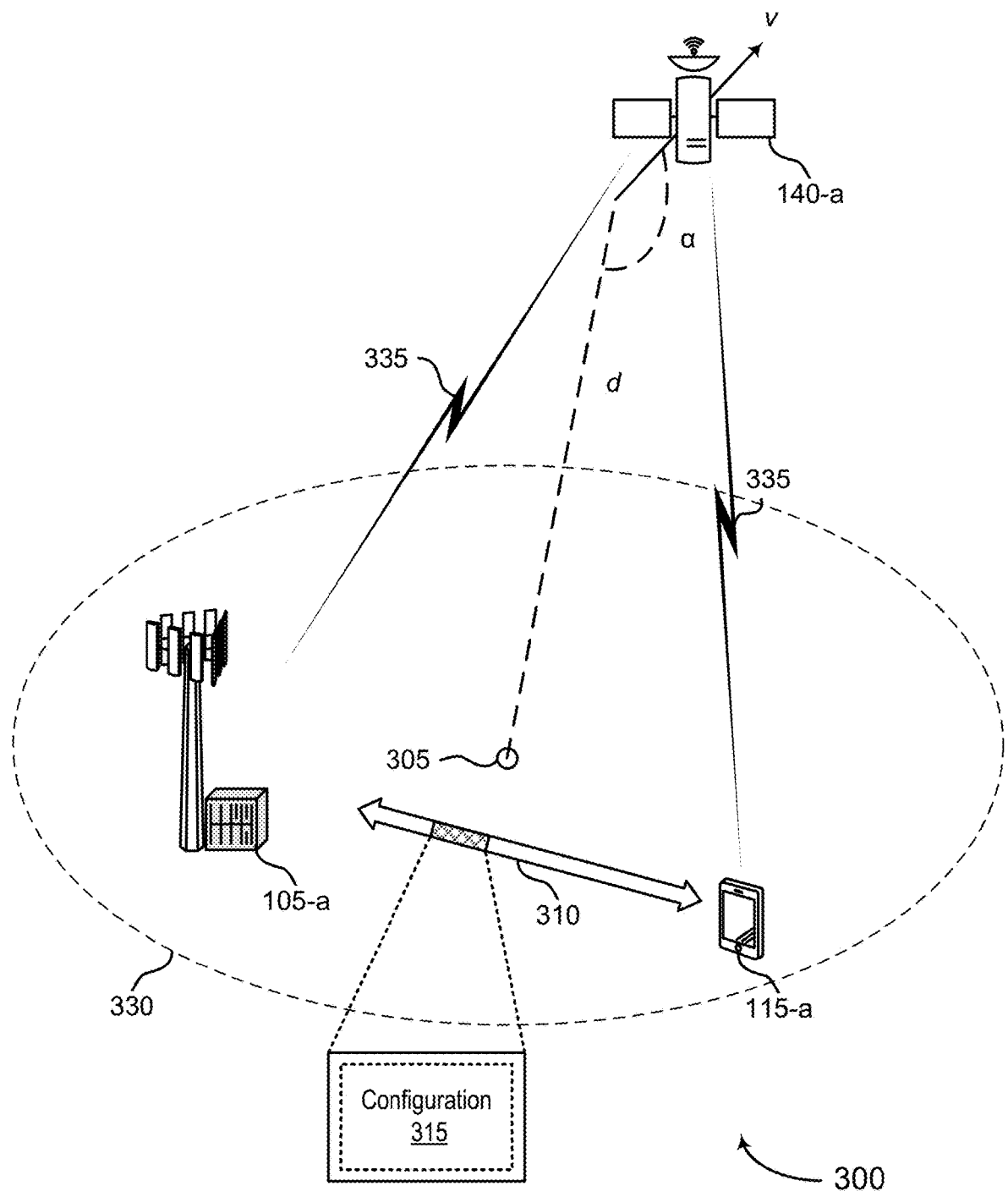
FIG. 3 is a diagram illustrating an example of a wireless communications system that supports cell type selection for a non-terrestrial network, in accordance with aspects of the present disclosure.

FIG. 3 is a diagram illustrating an example of a wireless communications system 300 that supports cell type selection procedures for non-terrestrial networks, in accordance with aspects of the present disclosure. In some examples, the wireless communications system 300 may implement aspects of the wireless communications system 100 of FIG. 1. The wireless communications system 300 may include a base station 105-a, a UE 115-a, and a satellite 140-a, which may be examples of the corresponding devices described with reference to FIG. 1. For example, the wireless communications system 300 may be a non-terrestrial network, which may include a base station 105-a, a UE 115-a, and a satellite 140-a. The satellite 140-a may relay communications for base stations (e.g., base station 105-a) and mobile terminals (e.g., UE 115-a). The base station 105-a may also be referred to as a gateway. The geographical area associated with a transmission beam of the satellite 140-a may be called a beam footprint 330 and the UE 115-a may communicate with the satellite 140-a when the UE 115-a is located within the beam footprint 330.

The base station 105-a may perform a communication procedure (e.g., a radio resource control (RRC) procedure, such as a cell acquisition procedure, random access procedure, RRC connection procedure, or RRC configuration procedure) with the UE 115-a. The base station 105-a may be configured with multiple antennas, which may be used for directional or beamformed transmissions. As part of the communication procedure, the base station 105-*a* may establish a bi-directional communication link 310 for communication with the UE 115-*a*. Additionally, or alternatively, as part of the communication procedure, the base station 105-*a* may configure the UE 115-*a* with a configuration 315 (e.g., time and frequency resources, a reference signal periodicity, or an indication of a symbol of a slot for transmitting reference signals) via RRC signaling. Although shown communicating directly, the present disclosure primarily focuses on when the UE 115-*a* communicates to the base station 105-*a* via the satellite 140-*a*.

The satellite 140-*a* may generate satellite information (e.g., ephemeris information) associated with communications between the satellite 140-*a*, the UE 115-*a*, and the base station 105-*a*. For example, the satellite 140-*a* may determine a propagation delay associated with transmissions between the satellite 140-*a*, the UE 115-*a*, and the base station 105-*a*. In some cases, the propagation delay may be based on the distance d from the satellite 140-*a* to a point 305 (e.g., center) of the beam footprint 330. In other cases, the propagation delay may be a factor of the distance d, which may correspond to the round-trip distance between the base station 105-*a* and the satellite 140-*a*. Additionally or alternatively, the propagation delay may be an estimated round-trip delay or a round-trip time between the UE 115-*a* and the base station 105-*a*, which may be based at least in part on the distance d and/or 2d. It should be noted that the distance d may not reflect the precise distance from the satellite 140-*a* to the UE 115-*a*. For example, the UE 115-*a* may be located at an edge of the beam footprint 330 and may be a different distance from the satellite 140-*a* than the distance d. However, such a difference in distance may be insignificant compared to the distance d. Thus, the distance d may be a sufficient representation of the distance from the satellite 140-*a* to the UE 115-*a*.

The satellite 140-*a* may transmit, via wireless communication links 335, the satellite information to the base station 105-*a* and/or the UE 115-*a*, which may be located within the beam footprint 330. In some cases, the satellite 140-*a* may update and transmit the satellite information to the base station 105-*a* and/or the UE 115-*a* at a preconfigured schedule (e.g., an update rate). The preconfigured schedule may be based on a velocity of the satellite 140-*a*. For example, the velocity of the satellite 140-*a* may result in a maximum round-trip time variation rate of 50 µs per second. That is, for every second of movement of the satellite 140-*a*, the round-trip time of communications between the satellite 140-*a* and the UE 115-*a*, for example, may vary by 50 µs. The round-trip time variation rate may also vary based on the movement of the satellite (e.g., orbit). In such instances, the satellite 140-*a* may update the satellite information multiple times every second. Additionally, or alternatively, the base station 105-*a* may transmit the satellite information to the UE 115-*a* via the bi-directional communication link 310, for example, as part of the configuration 315. In some cases, the base station 105-*a* may transmit the satellite information to the UE 115-*a* based on the preconfigured schedule, for example, the update rate of the satellite 140-*a*.

The satellite information may also include the velocity of the satellite 140-*a*. The velocity of the satellite 140-*a* may, in some cases, be defined by or relate to the following expression $v \times \cos(\alpha)$, where $\alpha$ is the angle between the vector of velocity v and the vector of distanced d. The UE 115-*a* may use the velocity of the satellite 140-*a* to determine the round-trip time variation rate. In some cases, the UE 115-*a* may determine the round-trip time variation rate using the velocity of the satellite 140-*a* based at least in part on the UE 115-*a* being located relative to the point 305 of the beam footprint 330. In some examples, using the velocity of the satellite 140-*a*, the round-trip time variation rate may be defined by the following expression $2v \times \cos(\alpha)/c$, where a is the angle between the vector of velocity v and the vector of distance d, and c is the speed of light. As such, if an upstream transmission is scheduled to be transmitted at time $t_0$ with a timing adjustment $t_a$, the actual transmission time by the UE 115-*a* may be $t_0+t_a$. For a subsequent upstream transmission scheduled to be transmitted at time $t_a+\Delta t$ without a new timing adjustment provided by the base station 105-*a*, the actual transmission time by the UE 115-*a* may be $t_a+\Delta t \times (-2v \times \cos(\alpha)/c)$.

When the UE 115-*a* is in a discontinuous reception (DRX) mode and in RRC_IDLE or RRC_CONNECTED state, the base station 105-*a* may transmit downlink control information in certain time and frequency resources (e.g., fixed symbols). Between these time and frequency resources, the UE 115-*a* may enter a lower-power state, also referred to as "sleep mode," so as to reduce power consumption and increase battery life for the UE 115-*a*. In RRC_IDLE or RRC_CONNECTED state, the UE 115-*a* may wakeup once every number of symbols to receive a downstream transmission from the base station 105-*a* and/or the satellite 140-*a*. The gap periods allocated prior to and following a reference signal transmission may benefit the base station 105-*a* by reducing or eliminating interference between the UE 115-*a* transmission and a transmission from another neighboring UE.

Figure 4:
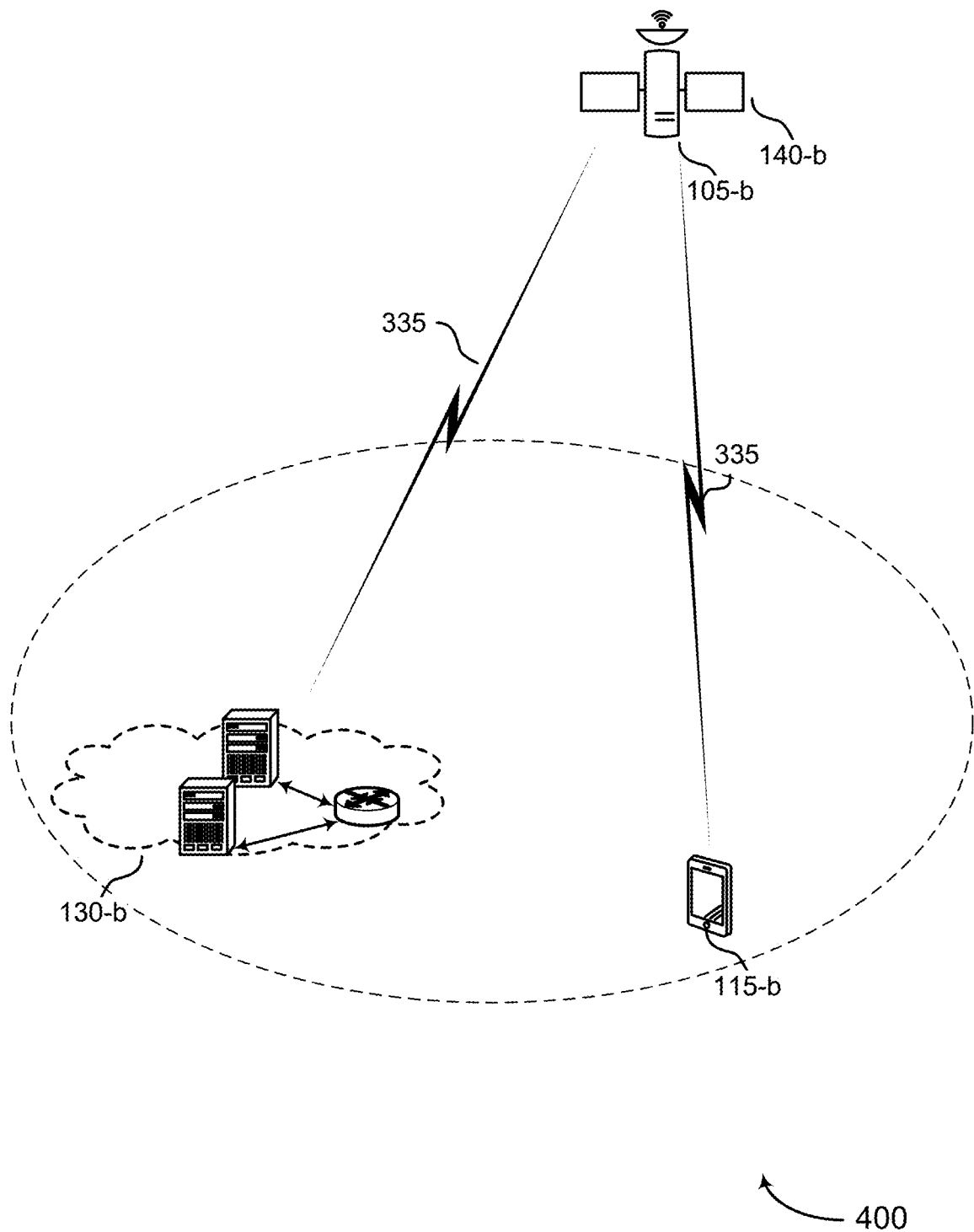
FIG. 4 is a diagram illustrating an alternate network configuration of a wireless communications system that supports cell type selection for a non-terrestrial network, in accordance with aspects of the present disclosure.

FIG. 4 is a diagram illustrating an alternate network configuration of a wireless communications system 400 that supports cell type selection for a non-terrestrial network, according to aspects of the present disclosure. In this configuration, the base station 105-*b* is located on the satellite 140-*b*. The base station 105-*b* communicates with the core network 130-*b* via wireless communication links 335. The UE 115-*b* communicates with the non-terrestrial base station 105-*b* via the wireless communication links 335.

Figure 5:
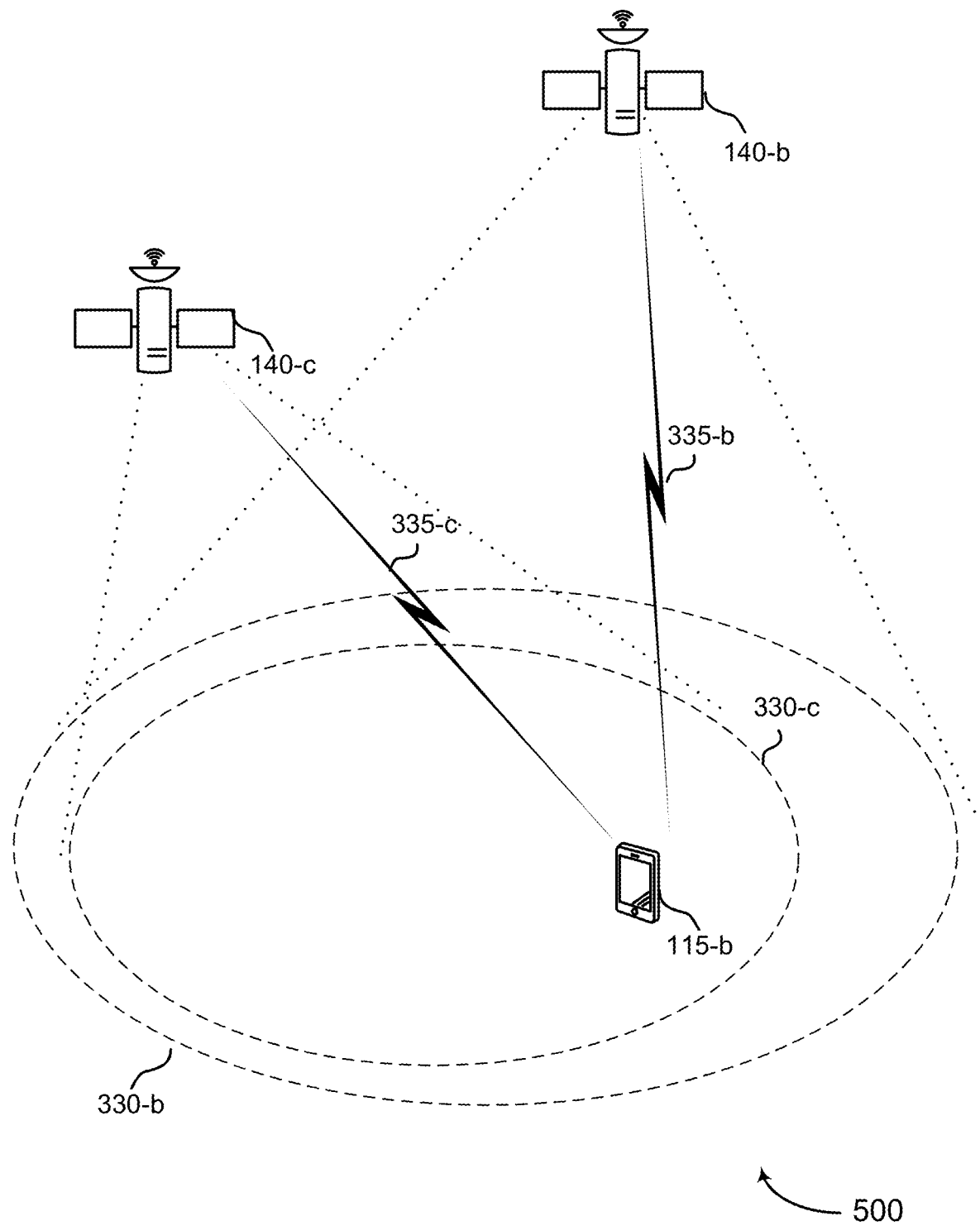
FIG. 5 is a diagram illustrating a network configuration of a wireless communications system that supports cell type selection for a non-terrestrial network, in accordance with aspects of the present disclosure.

FIG. 5 is a diagram illustrating a network configuration of a wireless communications system 500 that supports cell type selection for a non-terrestrial network, according to aspects of the present disclosure. In FIG. 5, two different satellites 140-*b* and 140-*c* are shown. For ease of explanation, the base stations and core network are not depicted. A first satellite 140-*b* may be a GEO satellite having a first beam footprint 330-*b*. A second satellite 140-*c* may be a LEO satellite having a second beam footprint 330-*c*. The UE 115-*b* communicates with the satellites 140-*b* and 140-*c* via wireless communication links 335-*b* and 335-*c*, respectively. In some aspects, the UE 115-*b* may have a preference for which cell type (e.g., LEO or GEO) it wants to select. In other aspects, the UE 115-*b* may have a limitation as to which cell type it can select. For example, certain cell types may have different requirements. Aspects of the present disclosure relate to how a UE selects a cell type (for example, LEO vs. GEO, or moving cell vs. fixed cell) during a cell selection or cell reselection procedure in a non-terrestrial network, or resumes connectivity while operating in a permanently fixed LEO cell type.

As shown in FIG. 5, in non-terrestrial networks (NTNs), a UE may be in coverage of multiple cells, with different cell types. Although FIG. 5 is described with respect to LEO and GEO cell types, other cell types also exist. For example, the cell type selection may be between terrestrial network and non-terrestrial network cell types. The UE may also consider other types of satellite cell types, such as, high-altitude platform station (HAPS) cell types and medium Earth orbit (MEO) cell types.

Moreover, a UE may select between a moving cell and a fixed cell, or between temporarily fixed and permanently fixed cells.

In order to select between different cell types, a UE should be able to distinguish one cell from another. A LEO satellite and GEO satellite may operate in a same band. Thus, by acquiring a synchronization signal block (SSB), the UE may not be able to distinguish whether the cell type is a LEO cell or a GEO cell.

Aspects of the present disclosure relate to techniques for detecting the cell type in the cell selection or cell reselection procedure. In one configuration, to detect a cell type (e.g., LEO cell vs. GEO cell), the LEO and GEO cells are configured to use different demodulation reference signals (DMRSs) for decoding the master information block (MIB). In another configuration, each one of the LEO and GEO cells is configured to use a different scrambling code for a physical broadcast channel (PBCH). In another configuration, physical cell IDs (PCIDs) or system information blocks SIBs (e.g., system information block, type 1 (SIB1)) are defined as LEO or GEO specific. In some cases, the UE may be provisioned to select only a specific cell type, for example, the LEO or GEO cell. Additionally, or alternatively, the UE may be configured with different priorities for different cell types. For example, the UE may prioritize selecting a LEO cell over a GEO cell, or the UE may have a preference to select a moving cell vs. fixed cell. Therefore, it may be desirable for the UE to distinguish the cell types.

Cell type priorities may be desirable due to requirements for operating in a specific cell type. For example, because a LEO satellite is at a lower altitude than a GEO satellite, the UE should more closely track time and frequency compensation parameters (e.g., timing advance (TA) and Doppler shift parameters) of the LEO satellite. The more frequent tracking is appropriate because Doppler shift and timing advance errors are more likely with the LEO satellite.

Examples of UE requirements for operating in a LEO or a GEO cell can include, for example, frequency compensation to address the Doppler effect and tracking of uplink (UL) timing pre-compensation. Additionally, a UE may be specified to support a large cell size, for example, with GEO cells. Thus, the UE may be specified to support a new physical random access channel (PRACH) format for GEO cells. Otherwise, the UE should select a LEO cell. Other UE requirements include, for example, supporting a larger number of hybrid automatic repeat request (HARQ) processes to maintain throughput or enabling and disabling HARQ processes or different quality of service (QoS) requirements (e.g., support of a different service data adaptation protocol (SDAP)/packet data convergence protocol (PDCP) configuration, larger PDCP discard timer and/or larger sequence number (SN) length).

According to aspects of the present disclosure, a cell may broadcast information on the UE requirements for operating in a particular cell type, such as a LEO or a GEO cell. For example, if a UE would like to operate in a LEO cell, the UE should support timing advance and Doppler compensation. If the UE does not satisfy these requirements, the UE should select another cell type.

Alternatively, UE profiles can be defined to indicate different requirements for operating in different cell types. In this example, the base station does not broadcast a list of requirements. Rather, the base station may broadcast an index representing a set of requirements. Upon reading the index, the UE recognizes the requirements for operating in the cell. The UE may be preconfigured or provisioned with details (e.g., configurations) of the requirements profile. In this option, a separate indication of the cell type (e.g., whether the cell is LEO or GEO) may not be needed.

According to aspects of the present disclosure, the UE may determine the requirements for operating in a particular cell type (e.g., LEO cell or GEO cell) by reading the SIB1 (or another SIB) of the cell. In other aspects, the UE may be configured with information indicating the operating requirements on a per PCID or per frequency basis. For example, the PCID and/or frequency may be mapped to a profile ID or index. In this example, the UE can determine, from the PCID, whether the UE can meet the requirements. If the UE cannot meet the requirements, the UE can bar the cell and exclude the cell as a candidate for cell reselection. Although SIB1 broadcasting is described, other SIBs, such as a non-terrestrial network specific SIB may carry the operating requirements or profile ID.

According to aspects of the present disclosure, a UE may also report its capabilities with respect to the requirements for operating in a particular cell type. Based on the reported capabilities, the network may redirect the UE to a suitable cell. For example, if the UE selects a GEO cell but reports capabilities that do not meet the operating requirements for a GEO cell, the base station may redirect the UE to a LEO cell (assuming the UE has capabilities matching the operating requirements of a LEO cell).

In other aspects, a cell may broadcast the requirements for operating in a particular cell type (or a supported profile) for each intra-frequency and/or inter-frequency neighbor cell (e.g., in a neighbor cell list) or frequencies within an inter-frequency list. Thus, the UE is aware of the requirements of not only the serving cell, but is also aware of the operating requirements for each neighbor cell, facilitating cell reselection. The broadcast may include a mapping of cell IDs (e.g., PCIDs) or frequencies to the UE requirements for operating in the particular cell. This mapping may help the UE with cell reselection. The base station may broadcast the mapping in a SIB message.

In addition to the requirements for operating in LEO cells and GEO cells, the base station may indicate whether the cell type is a moving cell, temporarily fixed cell, or permanently fixed cell. In some aspects, this indication can be implicitly learned from a beam pattern configuration in the SIB message.

A LEO fixed cell can be further differentiated as a LEO temporarily fixed cell or a LEO permanently fixed cell. For a permanently fixed cell, in an RRC_CONNECTED state, the UE may experience service interruption during a satellite handover. That is, the cell ID, system information block (SIB) configuration, and radio resource control (RRC) configuration remain the same, while the operation of the cell hands over from one satellite to another satellite. In this case, the RRC connection may be suspended during interruption and resumed after the interruption. This may be the special case of satellite handover while the gateway and/or the base station serving the UE remains same. In an RRC_IDLE state, the UE may experience an outage or loss of signal during satellite handover. In this case, paging monitoring may be suspended during the outage and resumed after the outage.

According to aspects of the present disclosure, a satellite communications gap may be configured in the UE. During this gap period, the UE pauses uplink/downlink (UL/DL) transmission or paging monitoring while the cell switches from a prior satellite to a new satellite. After the gap period, the UE resumes communications with the new satellite. If the UE does not support such an operating specification, the UE may not select a LEO permanently fixed cell.

The cell stop time may be broadcast in a SIB. The cell stop time broadcast in the SIB may be used as a starting point for the interruption. Duration of the interruption may also be indicated.

Figure 6:
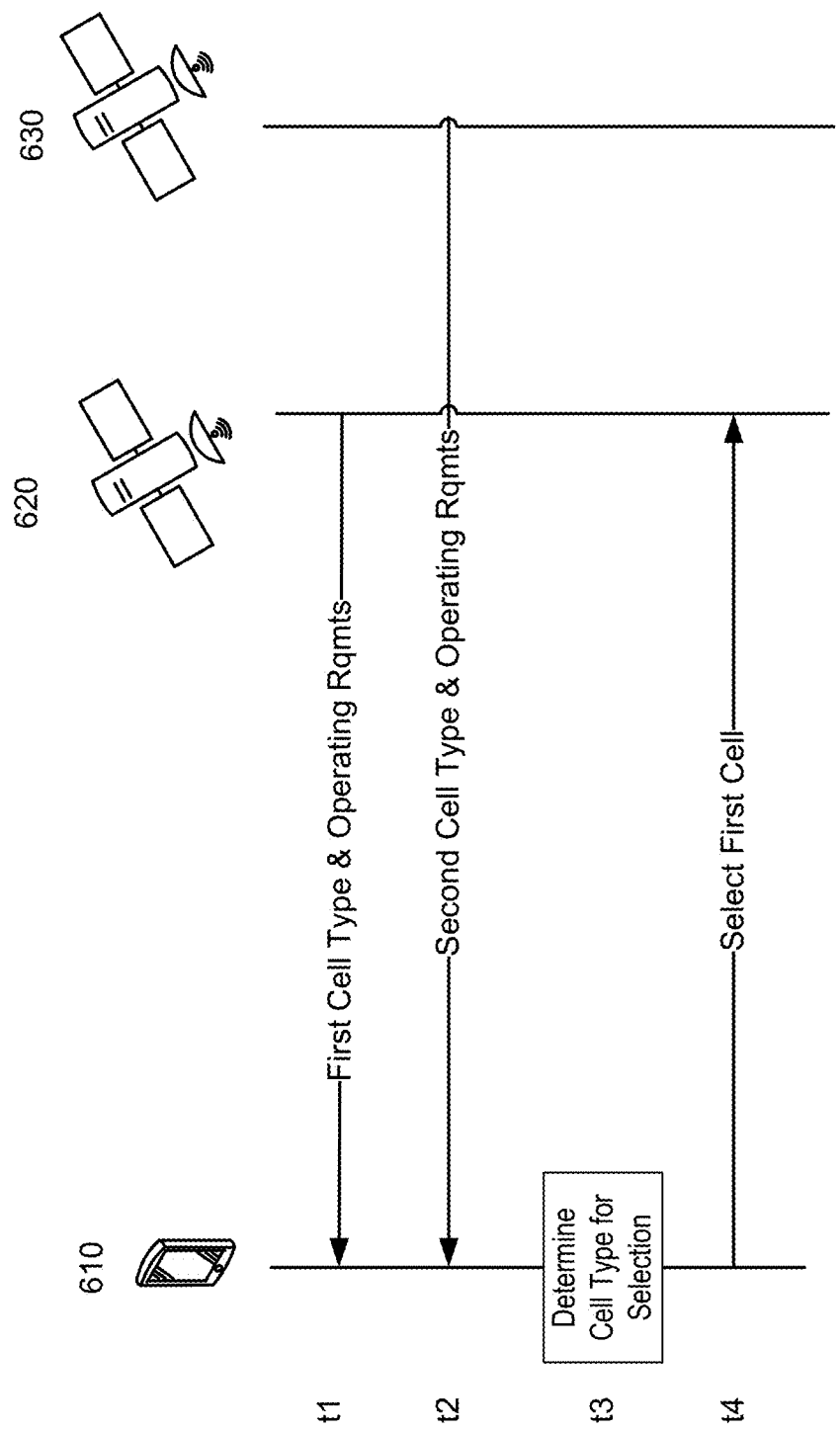
FIG. 6 is a call flow diagram illustrating cell type selection in a non-terrestrial network, in accordance with aspects of the present disclosure.

FIG. 6 is a call flow diagram illustrating cell type selection in a non-terrestrial network, in accordance with aspects of the present disclosure. At time t1, a UE 610 receives an indication from a satellite 620 of a first cell type. In this example, the first cell type is a LEO cell type. The UE 610 also receives requirements for operating in the LEO cell type. At time t2, the UE 610 receives an indication from a satellite 630 of a second cell type. In this example, the second cell type is a GEO cell type. The UE 610 also receives requirements for operating in the GEO cell type.

At time t3, the UE 610 determines which cell type to select. In this example, the UE is configured with a priority list in which LEO is first priority and GEO is second priority. The UE 610 also checks the operating requirements to confirm the UE has the capability to support the operating requirements. At time t4, the UE 610 selects the satellite 620 of the first cell type (e.g., LEO).

As indicated above, FIGS. 3-6 are provided as examples. Other examples may differ from what is described with respect to FIGS. 3-5.

Figure 7:
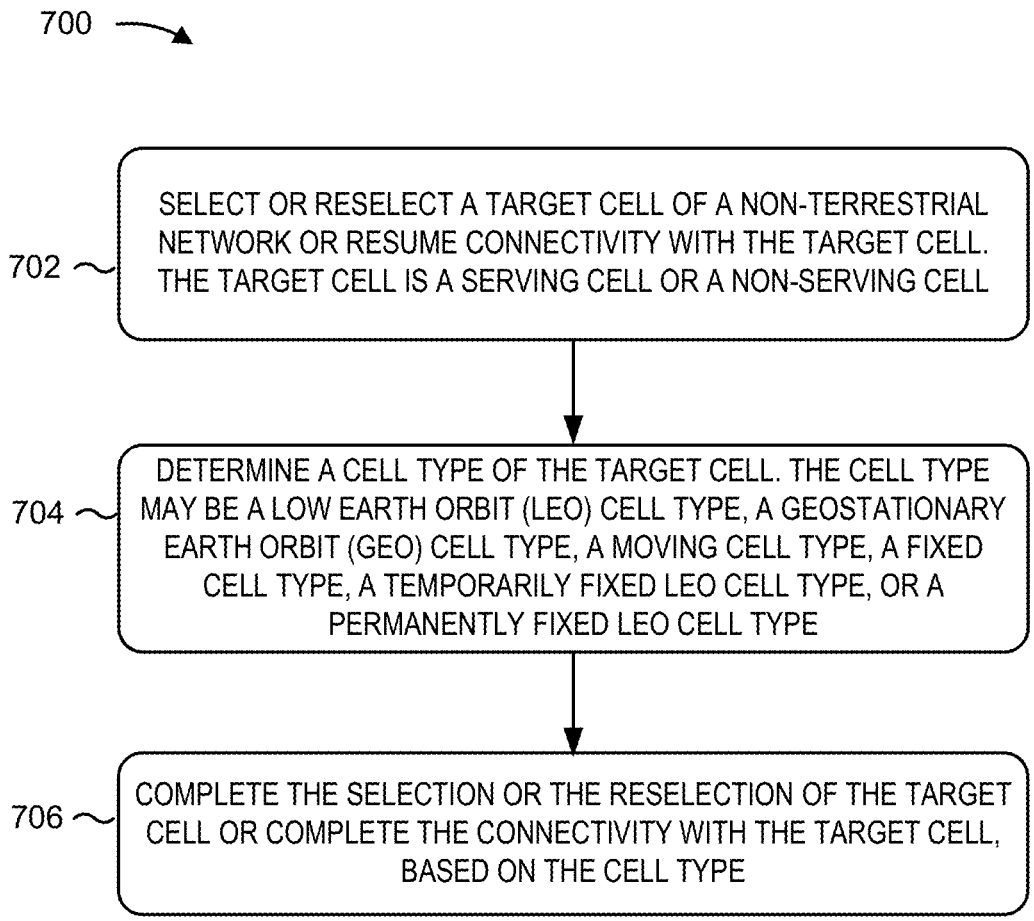
FIG. 7 is a flow diagram illustrating an example process performed, for example, by a user equipment (UE), in accordance with various aspects of the present disclosure.

FIG. 7 is a flow diagram illustrating a method 700, performed, for example, by a user equipment (UE) that supports cell type selection procedures for non-terrestrial networks, in accordance with aspects of the present disclosure. The operations of the method 700 may be implemented by a network device or its components as described, for example, a UE 115.

As shown in FIG. 7, in some aspects, the method 700 may include selecting or reselecting a target cell of a non-terrestrial network or resuming connectivity with the target cell (block 702). For example, the user equipment (UE) (e.g., using the antenna 252, DEMOD/MOD 254, MIMO detector 256, TX MIMO processor 266, receive processor 258, transmit processor 264, controller/processor 280, and/or memory 282) can select or reselect a target cell or resume connectivity. In some aspects, the target cell is a serving cell or a non-serving cell.

The method 700 may include determining a cell type of the target cell (block 704). For example, the UE (e.g., using the antenna 252, DEMOD/MOD 254, MIMO detector 256, receive processor 258, controller/processor 280, and/or memory 282) can determine a cell type of the target cell. The cell type may be a low Earth orbit (LEO) cell type, a geostationary Earth orbit (GEO) cell type, a moving cell type, a fixed cell type, a temporarily fixed LEO cell type, or a permanently fixed LEO cell type. For example, the UE may determine the cell type based on a demodulation reference signal (DMRS) to decode a master information block (MIB), a scrambling code for a physical broadcast channel (PBCH), and/or a physical cell identity (PCID). In other aspects, the UE determines the cell type based on a beam pattern configuration within a system information block (SIB) message.

The method 700 may also include completing selection or reselection of the target cell based on the cell type (block 706). For example, the UE (e.g., using the antenna 252, DEMOD/MOD 254, MIMO detector 256, TX MIMO processor 266, receive processor 258, transmit processor 264, controller/processor 280, and/or memory 282) can complete selection or reselection of the target cell. In some aspects, completing the selection or the reselection or the connectivity is for only one cell type. In other aspects, completing the selection or reselection or the connectivity is in accordance with a set of priorities, each priority of the set corresponding to a different cell type.

Example Aspects

Aspect 1: A method of wireless communication, by a user equipment (UE), comprising: selecting or reselecting of a target cell of a non-terrestrial network or resuming connectivity with the target cell, the target cell comprising a serving cell or a non-serving cell; determining a cell type of the target cell, the cell type comprising a low Earth orbit (LEO) cell type, a geostationary Earth orbit (GEO) cell type, a moving cell type, a fixed cell type, a temporarily fixed LEO cell type, or a permanently fixed LEO cell type; and completing the selection or the reselection of the target cell or completing the connectivity with the target cell, based on the cell type.

Aspect 2: The method of Aspect 1, in which determining the cell type is based on a demodulation reference signal (DMRS) to decode a master information block (MIB), a scrambling code for a physical broadcast channel (PBCH), and/or a physical cell identity (PCID).

Aspect 3: The method of Aspect 1 or 2, further comprising completing the selection or the reselection or the connectivity for only one cell type.

Aspect 4: The method of any of the preceding Aspects, further comprising completing the selection or reselection or the connectivity in accordance with a set of priorities, each priority of the set corresponding to one of a plurality of different cell types.

Aspect 5: The method of any of the preceding Aspects, further comprising obtaining requirements for operating in the cell type, the determining of the cell type based on the requirements.

Aspect 6: The method of Aspect 5, in which the requirements are obtained via broadcast information.

Aspect 7: The method of Aspect 6, in which the broadcast information comprises a profile identity corresponding to the requirements for operating in the cell type.

Aspect 8: The method of Aspect 6, in which the broadcast information comprises a physical cell identity (PCID) and/or frequency mapped to a profile identity.

Aspect 9: The method of Aspect 6, in which the broadcast information is obtained via a non-terrestrial network specific system information block (SIB) message.

Aspect 10: The method of Aspect 6, in which the requirements are associated with a plurality of neighbor cells within a neighbor cell list or frequencies within an inter-frequency list.

Aspect 11: The method of Aspect 6, in which the broadcast information comprises a mapping of cell IDs or cell frequencies to the requirements for operating in the cell type.

Aspect 12: The method of Aspect 5, further comprising barring the target cell in response to being unable to meet the requirements for operating the cell type.

Aspect 13: The method of Aspect 5, in which the requirements for operating in the cell type are based on a frequency compensation to address a Doppler effect, tracking of uplink timing pre-compensation, support of a large cell size, support of a quantity of hybrid automatic repeat request (HARQ) processes exceeding a first threshold, an ability to enable and disable HARQ processes, or support of quality of service (QoS) specifications.

Aspect 14: The method of Aspect 13, in which the QoS specifications comprise: support of a particular service data adaptation protocol (SDAP) configuration, support of a particular packet data convergence protocol (PDCP) configuration, support of a PDCP discard timer exceeding a second threshold, and/or support of a sequence number (SN) having a length greater than a third threshold.

Aspect 15: The method of any of the preceding Aspects, further comprising reporting UE capabilities related to requirements for operating in the cell type.

Aspect 16: The method of Aspect 15, further comprising obtaining instructions to redirect to a different target cell based on the UE capabilities.

Aspect 17: The method of any of the preceding Aspects, in which determining the cell type is based on a beam pattern configuration within a system information block (SIB) message.

Aspect 18: The method of any of the preceding Aspects, further comprising obtaining a satellite communications gap configuration in response to the cell type being the permanently fixed LEO cell type.

Aspect 19: The method of any of the preceding Aspects, further comprising barring the permanently fixed LEO cell type in response to the UE being unable to be configured with a satellite communications gap.

Aspect 20: The method of any of the preceding Aspects, in which the permanently fixed LEO cell type comprises a cell serviced by a first satellite and then a second satellite after a satellite handover, with a satellite communications gap occurring during the satellite handover.

Aspect 21: The method of Aspect 20, in which a cell identification (ID) remains the same after the satellite handover.

Aspect 22: The method of Aspect 20, in which a system information block (SIB) configuration and a radio resource control (RRC) configuration remain the same after the satellite handover and resuming communication after the satellite communications gap.

Aspect 23: The method of Aspect 20, further comprising obtaining an indication of a duration of the satellite communications gap.

Aspect 24: The method of Aspect 20, further comprising obtaining a system information block (SIB) including a cell stop time as a starting point of the satellite communications gap.

Aspect 25: An apparatus for wireless communication by a user equipment (UE), comprising: at least one processor, memory coupled with the at least one processor; and instructions stored in the memory and operable, when executed by the at least one processor, to cause the apparatus: to select or reselect a target cell of a non-terrestrial network or resuming connectivity with the target cell, the target cell comprising a serving cell or a non-serving cell; to determine a cell type of the target cell, the cell type comprising a low Earth orbit (LEO) cell type, a geostationary Earth orbit (GEO) cell type, a moving cell type, a fixed cell type, a temporarily fixed LEO cell type, or a permanently fixed LEO cell type; and to complete the selection or the reselection of the target cell or complete the connectivity with the target cell, based on the cell type.

Aspect 26: The apparatus of Aspect 25, in which the at least one processor causes the apparatus to determine the cell type based on a demodulation reference signal (DMRS) to decode a master information block (MIB), a scrambling code for a physical broadcast channel (PBCH), and/or a physical cell identity (PCID).

Aspect 27: The apparatus of Aspect 25 or 26 in which the permanently fixed LEO cell type comprises a cell serviced by a first satellite and then a second satellite after a satellite handover, with a satellite communications gap occurring during the satellite handover.

Aspect 28: The apparatus of any of the Aspects 25-27, in which a cell identification (ID) remains the same after the satellite handover.

Aspect 29: The apparatus of any of the Aspects 25-28, in which the at least one processor is further configured to obtain an indication of a duration of the satellite communications gap.

Aspect 30: A user equipment, comprising means for performing the operations of one or more of Aspects 1-24.

Aspect 31: A user equipment, comprising a transceiver, a memory and at least one processor configured to perform the operations of one or more of Aspects 1-24.

Aspect 32: A computer-readable medium for wireless communications by a user equipment (UE), comprising codes executable by the UE to perform the operations of one or more of Aspects 1-24.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, by a user equipment (UE), comprising:
   selecting or reselecting of a target cell of a non-terrestrial network or resuming connectivity with the target cell, the target cell comprising a serving cell or a non-serving cell; and
   completing the selection or the reselection of the target cell or completing the connectivity with the target cell, based on a cell type, said cell type comprising a low Earth orbit (LEO) cell type, a geostationary Earth orbit (GEO) cell type, a moving cell type, a fixed cell type, a temporarily fixed LEO cell type, or a permanently fixed LEO cell type,
   wherein the permanently fixed LEO cell type comprises a cell serviced by a first satellite and then a second satellite after a satellite handover, with a satellite communications gap occurring during the satellite handover.

2. The method of claim 1, the cell type is based on at least one of a demodulation reference signal (DMRS) to decode a master information block (MIB), a scrambling code for a physical broadcast channel (PBCH), or a physical cell identity (PCID).

3. The method of claim 1, further comprising completing the selection or the reselection or the connectivity for only one cell type.

4. The method of claim 1, further comprising completing the selection or reselection or the connectivity in accordance with a set of priorities, each priority of the set corresponding to one of a plurality of different cell types.

5. The method of claim 1, further comprising obtaining requirements for operating in the cell type, wherein the cell type is based on the requirements.

6. The method of claim 5, in which the requirements are obtained via broadcast information.

7. The method of claim 6, in which the broadcast information comprises a profile identity corresponding to the requirements for operating in the cell type.

8. The method of claim 6, in which the broadcast information comprises a physical cell identity (PCID) and/or frequency mapped to a profile identity.

9. The method of claim 6, in which the broadcast information is obtained via a non-terrestrial network specific system information block (SIB) message.

10. The method of claim 6, in which the requirements are associated with a plurality of neighbor cells within a neighbor cell list or frequencies within an inter-frequency list.

11. The method of claim 6, in which the broadcast information comprises a mapping of cell IDs or cell frequencies to the requirements for operating in the cell type.

12. The method of claim 5, further comprising barring the target cell in response to being unable to meet the requirements for operating the cell type.

13. The method of claim 5, in which the requirements for operating in the cell type are based on a frequency compensation to address a Doppler effect, tracking of uplink timing pre-compensation, support of a large cell size, support of a quantity of hybrid automatic repeat request (HARQ) processes exceeding a first threshold, an ability to enable and disable HARQ processes, or support of quality of service (QoS) specifications.

14. The method of claim 13, in which the QoS specifications comprise: support of a particular service data adaptation protocol (SDAP) configuration, support of a particular packet data convergence protocol (PDCP) configuration, support of a PDCP discard timer exceeding a second threshold, and/or support of a sequence number (SN) having a length greater than a third threshold.

15. The method of claim 1, further comprising reporting UE capabilities related to requirements for operating in the cell type.

16. The method of claim 15, further comprising obtaining instructions to redirect to a different target cell based on the UE capabilities.

17. The method of claim 1, in which determining the cell type is based on a beam pattern configuration within a system information block (SIB) message.

18. The method of claim 1, further comprising obtaining a satellite communications gap configuration in response to the cell type being the permanently fixed LEO cell type.

19. The method of claim 1, further comprising barring the permanently fixed LEO cell type in response to the UE being unable to be configured with a satellite communications gap.

20. The method of claim 1, in which a cell identification (ID) remains the same after the satellite handover.

21. The method of claim 1, in which a system information block (SIB) configuration and a radio resource control (RRC) configuration remain the same after the satellite handover and resuming communication after the satellite communications gap.

22. The method of claim 1, further comprising obtaining an indication of a duration of the satellite communications gap.

23. The method of claim 1, further comprising obtaining a system information block (SIB) including a cell stop time as a starting point of the satellite communications gap.

24. An apparatus for wireless communication, comprising:
   at least one processor,
   memory coupled with the at least one processor; and
   instructions stored in the memory and operable, when executed by the at least one processor, to cause the apparatus to:
      select or reselect a target cell of a non-terrestrial network or resuming connectivity with the target cell, the target cell comprising a serving cell or a non-serving cell; and
      complete the selection or the reselection of the target cell or complete the connectivity with the target cell, based on the cell type, said cell type comprising a low Earth orbit (LEO) cell type, a geostationary Earth orbit (GEO) cell type, a moving cell type, a fixed cell type, a temporarily fixed LEO cell type, or a permanently fixed LEO cell type,
      wherein the permanently fixed LEO cell type comprises a cell serviced by a first satellite and then a second satellite after a satellite handover, with a satellite communications gap occurring during the satellite handover.

25. The apparatus of claim 24, in which the at least one processor causes the apparatus to determine the cell type based on a demodulation reference signal (DMRS) to decode a master information block (MIB), a scrambling code for a physical broadcast channel (PBCH), and/or a physical cell identity (PCID).

26. The apparatus of claim 24, in which a cell identification (ID) remains the same after the satellite handover.

27. The apparatus of claim 24, in which the at least one processor is further configured to obtain an indication of a duration of the satellite communications gap.

28. The method of claim 24, wherein at least one of:
a cell identification (ID) remains the same after the satellite handover; or
a system information block (SIB) configuration and a radio resource control (RRC) configuration remain the same after the satellite handover and resuming communication after the satellite communications gap.

29. The method of claim 24, further comprising at least one of:
obtaining an indication of a duration of the satellite communications gap; or
obtaining a system information block (SIB) including a cell stop time as a starting point of the satellite communications gap.

30. A user equipment (UE), comprising:
at least one processor,
memory coupled with the at least one processor;
instructions stored in the memory and operable, when executed by the at least one processor, to cause the UE to:
select or reselect a target cell of a non-terrestrial network or resuming connectivity with the target cell, the target cell comprising a serving cell or a non-serving cell; and
complete the selection or the reselection of the target cell or complete the connectivity with the target cell, based on the cell type, said cell type comprising a low Earth orbit (LEO) cell type, a geostationary Earth orbit (GEO) cell type, a moving cell type, a fixed cell type, a temporarily fixed LEO cell type, or a permanently fixed LEO cell type,
wherein the permanently fixed LEO cell type comprises a cell serviced by a first satellite and then a second satellite after a satellite handover, with a satellite communications gap occurring during the satellite handover; and
a transceiver coupled to the memory and at least one processor, the transceiver configured to communicate with the target cell after completing the selection or the reselection or completing the connectivity.

* * * * *